A. W. SPRAGUE & T. E. MULROYAN.
GATE.
APPLICATION FILED OCT. 19, 1908.
953,066.
Patented Mar. 29, 1910.
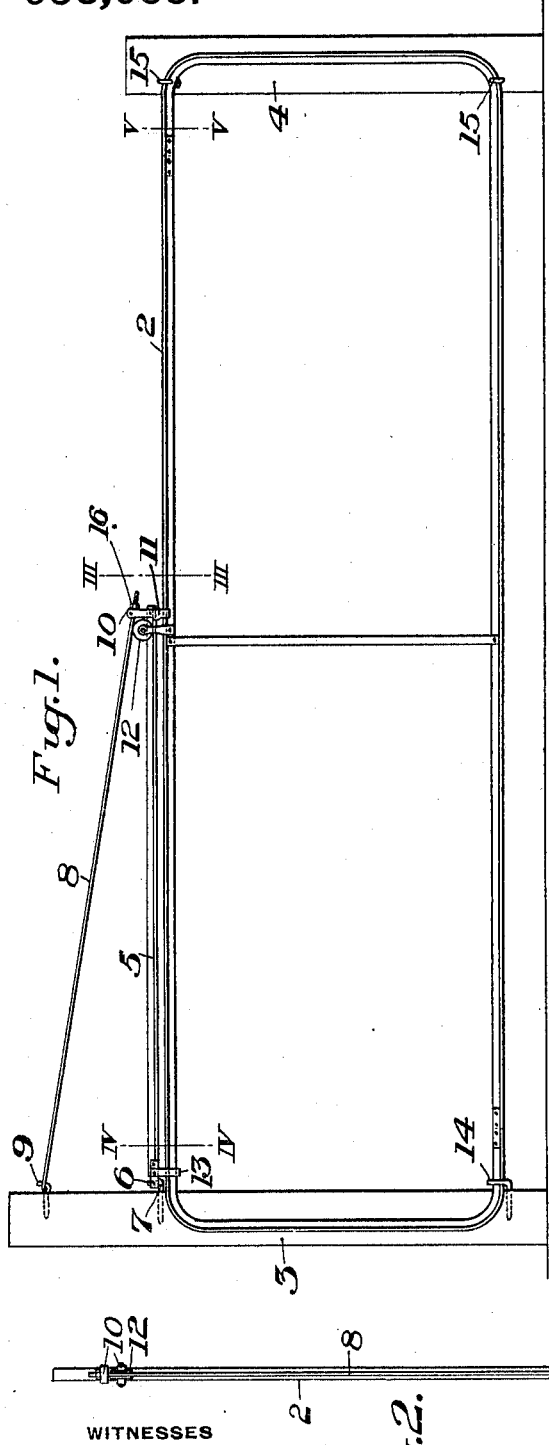
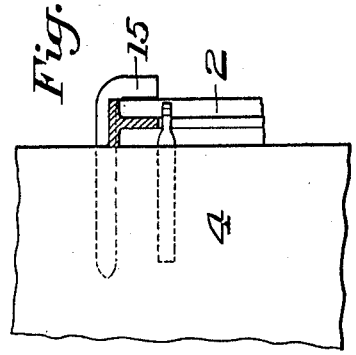
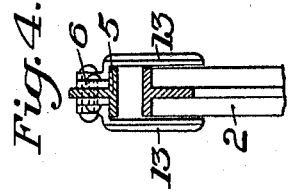
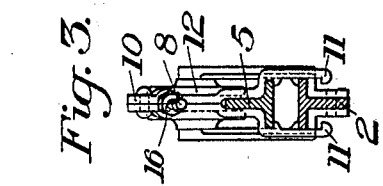
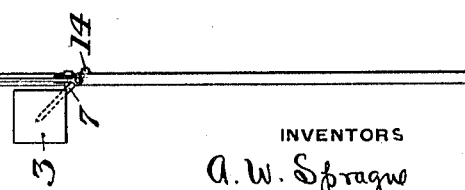
WITNESSES
R A Balderson
G. Lebenters
INVENTORS
A. W. Sprague
T. E. Mulroyan,
by Bakewell, Byrnes & Parmelee.
their Attys.

UNITED STATES PATENT OFFICE.

ARTHUR W. SPRAGUE, OF LA GRANGE, AND THOMAS E. MULROYAN, OF DE KALB, ILLINOIS, ASSIGNORS TO AMERICAN STEEL & WIRE COMPANY, OF CHICAGO, ILLINOIS, A CORPORATION OF NEW JERSEY.

GATE.

953,066.  Specification of Letters Patent.  Patented Mar. 29, 1910.

Application filed October 19, 1908. Serial No. 458,402.

*To all whom it may concern:*

Be it known that we, ARTHUR W. SPRAGUE, of La Grange, Cook county, Illinois, and THOMAS E. MULROYAN, of De Kalb, Dekalb county, Illinois, have invented a new and useful Improvement in Gates, of which the following is a full, clear, and exact description, reference being had to the accompanying drawings, forming part of this specification, in which—

Figure 1 is a side elevation of one form of gate embodying our invention; Fig. 2 is a top plan view showing the gate in an open position; and Figs. 3, 4 and 5 are detail sectional views taken respectively on the lines III—III, IV—IV and V—V of Fig. 1.

Our invention has relation to gates of the combined swinging and sliding type, and is designed to provide a simple gate of this character having supporting means arranged to support a large part of the weight of the gate in its different positions, so that its movement requires but very little effort, these supporting means also acting to prevent sagging of the gate on its hinges.

The nature of our invention will be best understood by reference to the accompanying drawings, in which we have shown one embodiment thereof, and which will now be described, it being premised, however, that various changes may be made in the details of construction and arrangement without departing from the spirit and scope of our invention as defined in the appended claims.

In these drawings, the numeral 2 designates the frame of the gate, which is here shown as composed of flanged metal bars, preferably T-shape in cross-section, 3 designates the hinge post and 4 the post at the opposite end against which the gate closes.

5 designates a supporting bar which is placed above and directly in the vertical plane of the gate frame, a short distance above the upper bar of said frame. This bar 5 is provided at its end adjacent to the post 3 with an eye 6, which engages a hinge pin 7 secured in post 3. The opposite end of said bar preferably extends a short distance beyond the longitudinal center of the gate, and is supported by a brace rod 8 connected at one end at 9 to the post 3 above the gate, and at its opposite end adjustably secured to a strap 10 by the nut 16. This strap is secured to the end portion of the bar 5 and provided with depending guide arms 11 which, as shown in Fig. 3, form a support for the gate by engaging with the under sides of the flanges of the top bar. Secured to the upper bar of the gate frame, or near its central portion, is a roller 12, which is arranged to travel on the flange of the bar 5. Adjacent to the hinge eye 6, the bar is provided with a guide 13 loosely embracing opposite sides of the upper bar of the frame to prevent the gate from swinging away from the post and to keep it in vertical alinement. The hinge post 3 is also provided with a guide hook 14, the purpose of which is to form a rest support for the gate, also to hold it in proper alinement.

15 designates suitable latch hooks for the free end of the gate when closed.

It will be readily seen that the gate may first be partially opened by sliding it endwise, as is customary with this type of gate, and then swinging it on its hinge as shown in Fig. 2, or it can be used entirely as a swinging gate after having been first pushed endwise past the post 4 sufficiently to clear the post. The bar 5 carries the main portion of the weight of the gate, so that its movement requires but little effort, and sagging of the gate on its hinge is prevented. By placing the bar 5 directly above the upper bar of the gate frame, it is entirely out of the way of any covering, such as wire netting, which may be attached to the frame, thus enabling any suitable form of covering or filling to be used on the frame. The adjustable brace rod provides a simple means for raising or lowering the outer end of the gate to meet various conditions to give the gate the proper hang at all places.

The flanged form of the frame gives it great strength, and facilitates its proper guidance in opening and closing, but we do not limit ourselves to any particular construction of this frame, since it may be made in any desired way.

What we claim is:—

1. In a combined swinging and sliding gate, a supporting bar arranged above the gate frame, a hinged connection between the bar and the gate post, an adjustable brace rod extending from the outer end of the bar of the gate post to a point above the bar, and means for supporting the gate frame on the upper face of the supporting bar; substantially as described.

2. In a combined swinging and sliding gate, the combination with a gate frame, of a supporting bar arranged above said frame and having a hinge connection with the post, said bar having means for supporting and guiding the gate frame, and a roller secured to the gate frame and adapted to travel on said bar; substantially as described.

3. In a combined swinging and sliding gate, the combination with a gate frame, of a supporting bar arranged above said gate frame, and having a hinged connection with the post, an adjustable support secured to the outer end of said bar and hinged to the gate post above the gate, means for supporting the gate on the bar, and means carried by the gate post for supporting and guiding the lower bar of the frame; substantially as described.

4. In a combined sliding and swinging gate, the combination with a gate frame, of a supporting bar having a hinge connection with a post and arranged to swing with the gate frame, a roller carried by the gate frame and arranged to travel on said bar, means for supporting the gate frame from said bar, and a supporting connection extending from the post to the other end of said bar; substantially as described.

5. In a combined sliding and swinging gate, a gate frame composed of metal bars having laterally projecting flanges, of a supporting bar arranged above the upper bar of the gate frame, and having depending guides and supports engaging the flanges of the top bar of the frame, and supporting and guiding means carried by the gate frame and adapted to travel on said bar; substantially as described.

6. In a combined swinging and sliding gate, the combination with an endwise movable gate frame, of a supporting bar arranged above the gate frame and having a hinge connection with the gate post, means carried by said bar for engaging and supporting the gate frame, and guiding and supporting means carried by the gate frame and adapted to travel on said bar; substantially as described.

In testimony whereof, we have hereunto set our hands.

ARTHUR W. SPRAGUE.
THOMAS E. MULROYAN.

Witnesses as to Arthur W. Sprague:
J. W. MEAKIN, Jr.,
H. A. PARKS.

Witnesses as to Thomas E. Mulroyan:
W. A. KILMER,
T. D. TEMPLE.